(12) United States Patent
Qi et al.

(10) Patent No.: US 6,805,983 B1
(45) Date of Patent: Oct. 19, 2004

(54) ACTIVATION OF ELECTROCHEMICAL CELLS WITH CATALYST ELECTRODES

(75) Inventors: Zhigang Qi, North Arlington, NJ (US); Arthur Kaufman, West Orange, NJ (US)

(73) Assignee: H Power Corporation, Belleville, NJ (US)

(*) Notice: Subject to any disclaimer, the term of this patent is extended or adjusted under 35 U.S.C. 154(b) by 269 days.

(21) Appl. No.: 10/072,592

(22) Filed: Feb. 11, 2002

(51) Int. Cl.[7] .............................................. H01M 8/00
(52) U.S. Cl. ...................... 429/13; 429/19; 429/26; 429/34; 429/35; 429/40; 429/41; 429/42; 429/30; 429/39; 429/12
(58) Field of Search ............................ 429/13, 19, 26, 429/34, 35, 40, 41, 42, 30, 39, 12

(56) References Cited

U.S. PATENT DOCUMENTS

| | | | |
|---|---|---|---|
| 4,166,143 A | 8/1979 | Petrow et al. | |
| 4,876,115 A | 10/1989 | Raistrick | |
| RE33,149 E | 1/1990 | Petrow et al. | |
| 5,211,984 A | 5/1993 | Wilson | |
| 5,723,173 A | 3/1998 | Fukuoka et al. | |
| 5,728,485 A | 3/1998 | Watanabe et al. | |
| 6,309,772 B1 | 10/2001 | Zuber et al. | |

OTHER PUBLICATIONS

Ticianelli et al, "Method To Advance Technology Of Proton Exchange Membrane Fuel Cells", J. Electrochem., Soc. pp 2209–2214 (1988), Sep.

Poltarzewski et al, "Nafion Distribution In Gas Diffusion Electrodes For Solid Polymer–Electrolyte–Fuel–Cell Applications", J. Electrochem., Soc. pp 761–765 (1992), Mar.

*Primary Examiner*—Randy Gulakowski
*Assistant Examiner*—Gentle E. Winter
(74) *Attorney, Agent, or Firm*—Mark Levy & Associates, PLLC; David L. Banner (57) ABSTRACT

A membrane-electrode assembly for electrochemical cells such as proton exchange membrane fuel cells and direct methanol fuel cells operating at ambient conditions are activated first by exposing them at a temperature higher than ambient temperature and with the gaseous reactants back-pressurized. The performance of the membrane-electrode assemblies, especially those whose electrodes are of low catalyst loadings made using supported catalysts, improves dramatically after the activation.

12 Claims, 6 Drawing Sheets

ACTIVATION OF ELECTROCHEMICAL CELLS WITH CATALYST ELECTRODES

FIELD OF THE INVENTION

This invention relates to electrochemical cells, such as proton exchange membrane (PEM) fuel cells, direct methanol fuel cells (DMFC) and, more particularly, to electrochemical cells operating at ambient temperatures and pressures and which comprise membrane-electrode assemblies whose electrodes are lightly loaded with catalyst.

BACKGROUND OF THE INVENTION

The performance of a proton exchange membrane (PEM) fuel cell and a direct methanol fuel cell (DMFC) is largely determined by the membrane-electrode assembly (MEA), which is composed of an anode that oxidizes the fuel, a cathode that reduces oxygen, and a proton transferring, ion-conducting membrane. The membrane prevents electrical short-circuiting between the anode and the cathode, and separates the fuel from the oxidant.

A PEM fuel cell normally uses hydrogen as the fuel, while a DMFC uses methanol as the fuel. The terms "fuel cell", or "cell", as used hereinafter, shall define either a PEM or DMFC-type fuel cell.

The fuel oxidation reaction and the oxygen reduction reaction of these cells, typically, are kinetically slow. Therefore, catalysts such as platinum and its alloys are often used to speed up these reactions.

In the fuel cells, the catalysts are generally made into porous layers that serve to increase the contact area between the reactants and the catalyst particles. The layers can be applied directly to the membrane or they can be applied to a gas diffusion medium. Carbon paper and carbon cloth-type materials are commonly used as gas diffusion media because of their good electrical conductivity, high corrosion resistance, and controllable porosity.

It is desirable to decrease the amount of noble metals used to fabricate the fuel cells in order to reduce the cost of manufacture. Catalyst layers comprising metal black with lower surface areas were initially used in the fuel cells. The catalyst loading for an electrode was required to be over 4.0 $mg/cm^2$ in order to achieve good performance.

Subsequently, catalyst layers containing supported metal nano-particles featuring higher surface areas were prepared, as illustrated in U.S. Pat. No. 4,166,143, granted to Petrow et al on Aug. 28, 1979, U.S. Pat. No. 4,876,115, granted to Raistrick on Oct. 24, 1989, and U.S. Pat. No. Re. 33,149 granted to Petrow et al on Jan. 16, 1990. The support has several functions. It provides sites for anchoring the metal particles during and after their formation. The particles formed in such an environment have small and uniform size. Particle coalescence, or aggregation, becomes less likely. Therefore, the catalyst does not lose its surface area as fast as an unsupported catalyst due to the chemical/physical interaction between the support and the metal particles. The support also provides electrical connection to catalyst particles carried upon different support materials. Carbon black is the most practical support material used in fuel cells because of its large surface area, good electrical conductivity, and high corrosion resistance.

Electrons and protons are both involved in fuel cell reactions, so it is necessary to provide good electrical and proton conductivities. This limits the reaction zone within the interface between the catalyst layer and the ion-conducting membrane for a traditional MEA. This interfacial region is extremely thin and the total surface area of the catalyst particles in this region is low. Thus, the catalyst layer cannot provide a high current density. The catalyst that is not in contact with the membrane is simply wasted. This can be changed by incorporating an ionic conductor, such as Nafion®, a perfluoronated ionomer made by E. I. DuPont, into the catalyst layers.

After Nafion incorporation, the entire catalyst layer conducts both electrons and protons so that catalyst utilization in the layer is improved dramatically. The catalyst layer will in turn generate and sustain a higher current density. Nafion can be impregnated into a catalyst layer by brushing and spraying it upon an electrode surface or by respectively floating or dipping the electrode upon or into a Nafion solution. Some illustrations were made by Ticianelli et al., Methods to advance technology of proton exchange membrane fuel cells, J. Electrochem., Soc. pp. 2209–2214 (1988), September; and Poltarzewski et al., Nafion® distribution in gas diffusion electrodes for solid polymer-electrolyte-fuel-cell applications, J. Electrochem. Soc. pp 761–765 (1992), March.

The advantage of applying Nafion this way provides an opportunity to incorporate polytetrafluoroethylene (PTFE), which is a water repelling agent, into the catalyst layer. This is usually accomplished before the application of Nafion so that the final catalyst layer will have a controllable hydrophobic character in order to reduce the likelihood of flooding. The disadvantage of this method, however, is that it is very difficult to control the amount of Nafion that is applied. This results in a non-homogeneous distribution of the Nafion material over the entire catalyst layer. The regions containing more Nafion material will be easily flooded, while the regions with insufficient Nafion material may not be able to provide enough proton conductivity. The Nafion may localize on the surface in one place, but penetrate the underlying gas diffusion medium in another place.

Another method of incorporating Nafion into the catalyst layer is to mix the catalysts directly with the Nafion, especially supported catalysts, and then use the resulting mixture to fabricate the catalyst layer, as illustrated in U.S. Pat. No. 5,211,984, granted to Wilson on May 18, 1993, U.S. Pat. No. 5,723,173, granted to Fukuoka et al on Mar. 3, 1998, U.S. Pat. No. 5,728,485, granted to Watanabe et al on Mar. 17, 1998, and U.S. Pat. No. 6,309,772, granted to Zuber et al on Oct. 30, 2001. The catalysts and Nafion mixture is easily achieved; they can form an even distribution through the entire catalyst layer. Solvents such as glycerol may be used during the mixing in order to achieve good viscosity and hold the catalyst particles in suspension in order to minimize their agglomeration, as shown in U.S. Pat. No. 5,211,984, granted to Wilson on May 18, 1993.

Sometimes, the Nafion solution is converted into a colloidal suspension by adding a proper organic solvent before mixing it with catalysts, as illustrated in U.S. Pat. No. 5,723,173, granted to Fukuoka et al on Mar. 3, 1998. This patent teaches that such a colloidal suspension can provide a good Nafion network for achieving a uniform distribution with the catalyst particles.

Directly mixing the Nafion with the catalyst, however, makes it almost impossible to incorporate PTFE into the catalyst layer. This is because PTFE needs to be sintered at a temperature in excess of 330° C., but such an elevated temperature will destroy Nafion. Without the PTFE, the catalyst layer is more likely to be flooded.

All of these recent developments have helped to decrease the catalyst loading from 4.0 $mg/cm^2$ or higher to 0.5 mg/cm² or less. However, a fuel cell that has slightly loaded catalyst electrodes and operates under ambient conditions shows much lower performance than a fuel cell using highly loaded catalyst electrodes. Even though the catalyst layer is made to conduct both protons and electrons through the mixing of the supported catalyst with Nafion, many of the catalyst sites will not become active under ambient conditions.

The present invention provides a procedure and an article made by the procedure, whereby catalyst utilization can be increased. The method comprises the activation of the membrane-electrode assembly. The activation procedure is much shorter than traditional "break-in" processes, yet also dramatically increases catalyst utilization.

SUMMARY OF THE INVENTION

Mixing a proton conducting material, such as Nafion, with a catalyst layer will improve fuel cell performance. However, providing a three-dimensional catalyst layer to conduct protons will not necessarily provide a well performing electrode. Many of the catalyst sites in such a layer will not be available for reaction. Some of a number of reasons could be that: a) the reactant cannot reach the catalyst sites because they are blocked; b) the Nafion near these catalyst sites cannot be easily hydrated; or c) the ionic or electronic continuity is not established at these sites.

Catalyst sites that cannot participate in the electrochemical reaction of the fuel cell are "dead". Making these "dead" sites active is one of the objectives of this invention. It has been found that temperature and pressurization play a crucial role in converting "dead" sites into active sites. Operating a fuel cell above ambient temperature, preferably close to 100° C., and applying a few atmospheres of pressure to the gaseous reactants, will quickly provide an activated fuel cell after only a number of hours. Such an activation procedure results in a dramatic increase in catalyst utilization. The fuel cell can then generate a much higher current density under ambient conditions.

One objective of the present invention is to provide increased catalyst utilization by a new activation procedure, especially for the electrodes of fuel cells with low catalyst loadings and fabricated with supported catalysts.

Another objective of this invention is to provide a means to boost the MEA of a fuel cell to a high performance within a few hours.

Still another objective of the present invention is to provide a fuel cell starting procedure, especially one where the fuel cell is intended to be operated under ambient conditions (e.g., ambient temperature and pressure).

BRIEF DESCRIPTION OF THE DRAWINGS

A complete understanding of the present invention may be obtained by reference to the accompanying drawings, when considered in conjunction with the subsequent detailed description, in which.

PREFERRED EMBODIMENT OF THE INVENTION

Generally speaking, a fuel cell is shown that is operated at a temperature and pressure for converting "dead" sites in the catalyst layer into active sites. Operating a fuel cell above ambient temperature, preferably close to 100° C., and applying a few atmospheres of pressure to the gaseous reactants, will quickly provide an activated fuel cell after only a number of hours. Such an activation procedure results in a dramatic increase in catalyst utilization. The fuel cell can then generate a much higher current density under ambient conditions.

EXAMPLE

An electrode with platinum loading of 0.12 mg/cm² was made using E-TEK 20% Pt/Vulcan XC-72 material. The catalyst and Nafion solution were mixed thoroughly before being applied to a gas diffusion medium, ELAT, a carbon cloth impregnated with carbon black and polytetrafluoroethylene (PTFE). Two pieces of the electrode with an active area of 10 cm² were hot-pressed onto a Nafion 112 membrane at 130° C.

The resulting membrane-electrode assembly (MEA) was tested in a single cell test fixture. The test fixture was composed of a pair of metal plates with serpentine flow-fields. The plates were coated with a metal nitride for corrosion protection. Rod-like heaters were inserted into the plates to control the cell temperature. Air and pure hydrogen were used as the reactants. The gaseous reactant, when needing humidification, was passed through a stainless steel water bottle. Otherwise, the gas bypassed the humidifier and was introduced to the cell at room temperature. A cell temperature of 35° C., a hydrogen humidification temperature of 45° C., and air humidification temperature of 45° C., are denoted herein as 35/45/45° C.

Figure 1:
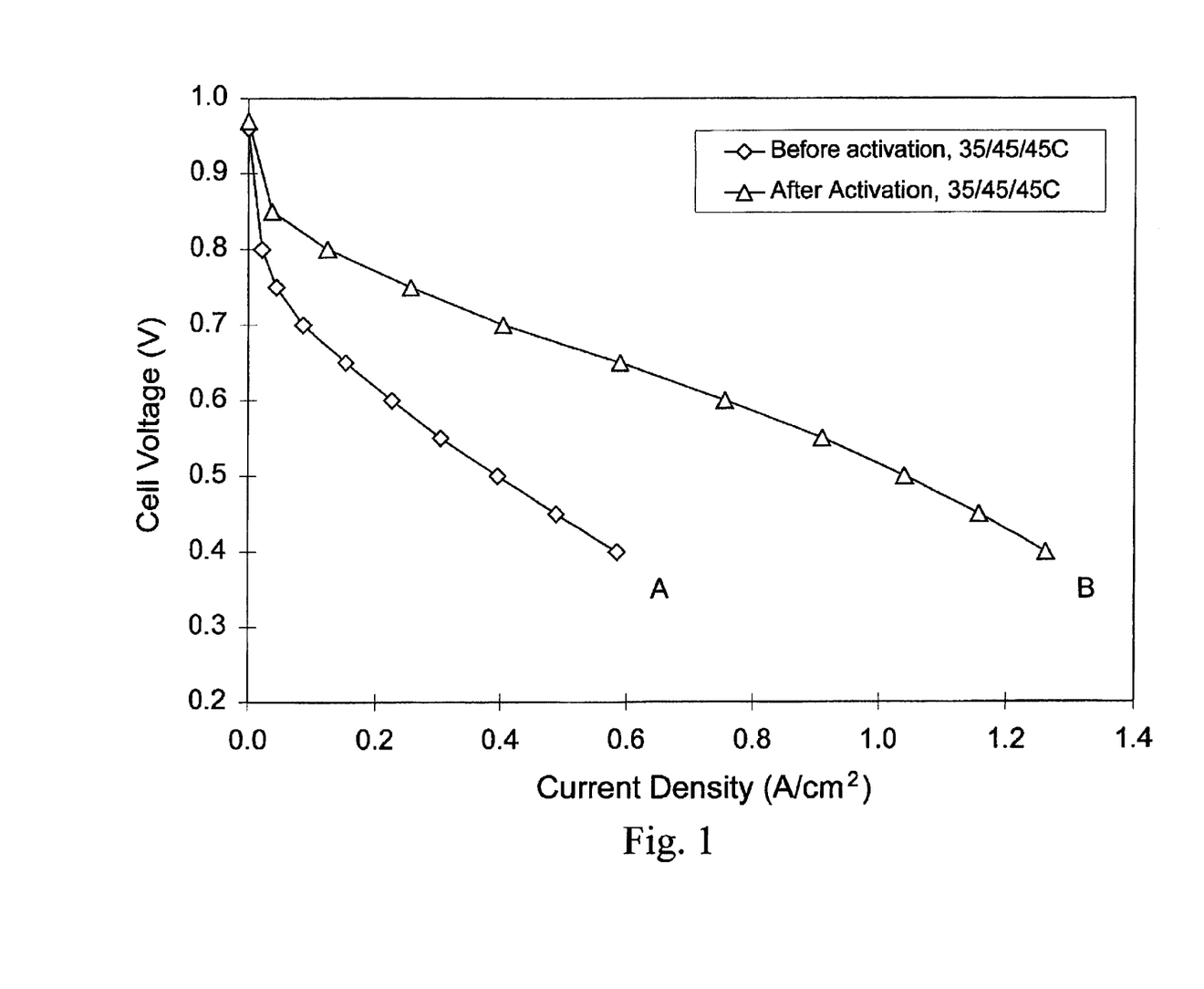
FIG. 1 shows a graph of the performances of an electrode (cathode) with a Pt loading of 0.12 mg/cm² at a cell temperature of 35° C. before and after the activation procedure of this invention.

Now referring to Curve A of FIG. 1, the performance of the electrode is illustrated after the cell has been operated at 35/45/45° C. for 180 minutes. The performance increased gradually during this time period, but after 180 minutes the cell did not show further increase in performance. The cell seems to reach its highest performance, no matter how much longer it is run under these conditions.

Curve B shows the performance of the same electrode after activation for 120 minutes. The activation was performed at a cell temperature of 75° C., hydrogen humidification temperature of 95° C., an air humidification temperature of 90° C., a hydrogen backpressure of 20 psig, and an air backpressure of 30 psig. The activation condition was denoted at 75/95/90° C. and 20/30 psig. During the activation, the cell voltage was set at between 0.40 and 0.60 V, for most of the time, in order to sustain a current density of 1.0 to 1.5 A/cm². However, the load was periodically changed so that the cell voltage was changed from open circuit voltage to as low as 0.1 V, backward and forward a few times. The cell performance at 75/95/90° C. and 20/30 psig was recorded every 30 minutes until it did not show any further increase. The temperatures of the cell and the humidifiers were then decreased to 35 and 45° C., respectively. During this cooling process, no load needs to be applied. After the cell and the humidifiers reached the desired temperatures, a load was applied and the performance of the cell at 35/45/45° C. was recorded. This was the performance of the cell after the activation. A dramatic increase in performance was achieved after the activation. Such an increase could never be achieved if the cell were tested only at 35/45/45° C. without the activation procedure of this invention.

Figure 2:
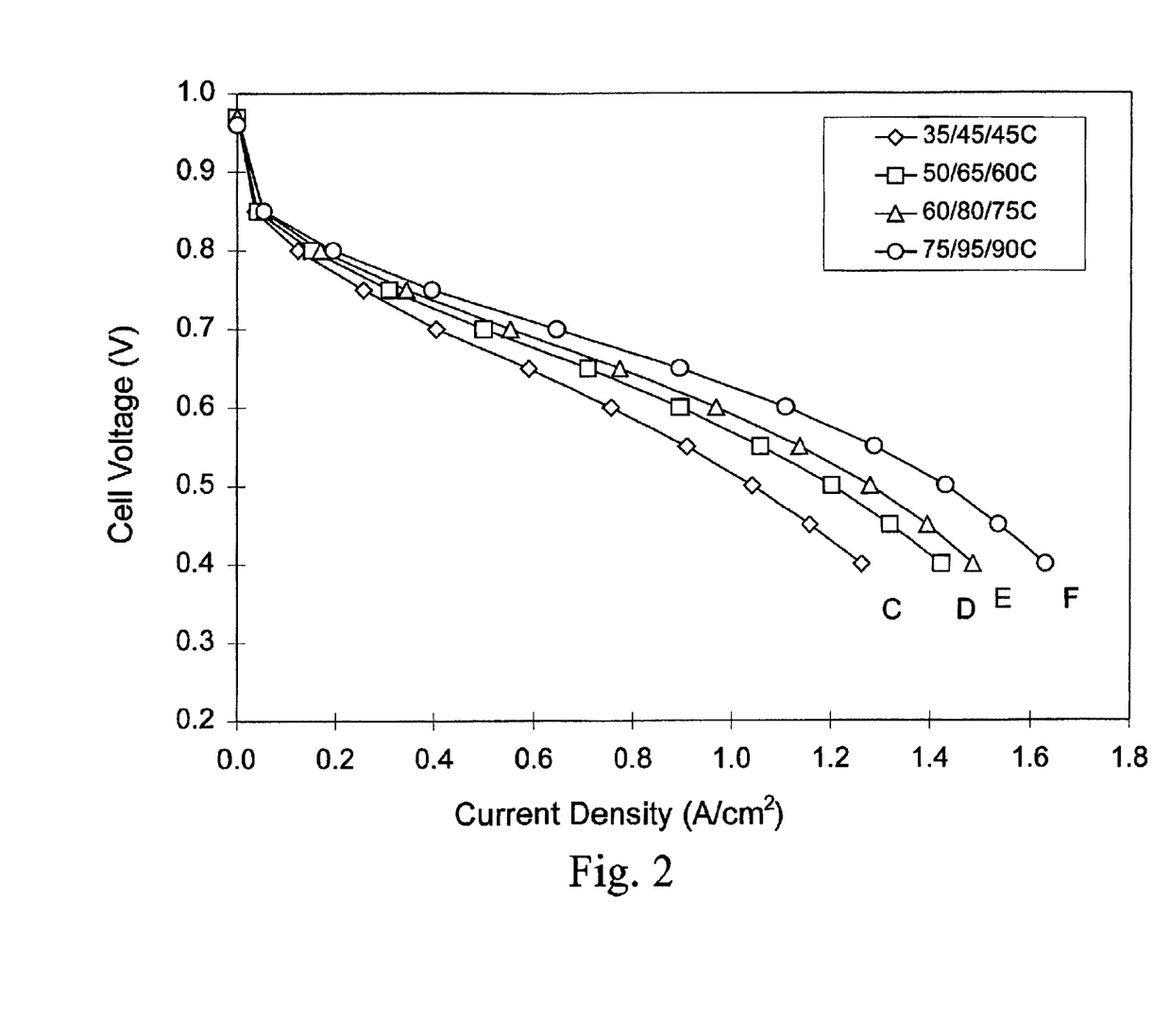
FIG. 2 illustrates a graph of the performance of the activated electrode of FIG. 1 at different temperatures.

Referring to FIG. 2, the performance of the activated electrode of the Example is shown at different cell and humidification temperatures. The conditions for Curves C, D, E, and F were 35/45/45, 50/65/60, 60/80/75 and 75/95/90° C., respectively. The humidification temperature was increased as the cell temperature was increased in order to make sure that the MEA was fully hydrated. Although the reactants' concentration, or partial pressure, decreased with increase in humidification temperature due to the presence of more water vapor, the cell performance increased with the cell temperature. Evidently, the increase in the kinetics of both the oxygen reduction reaction and hydrogen oxidation reaction with temperature overcame the decrease in the reactants' concentrations.

Figure 3:
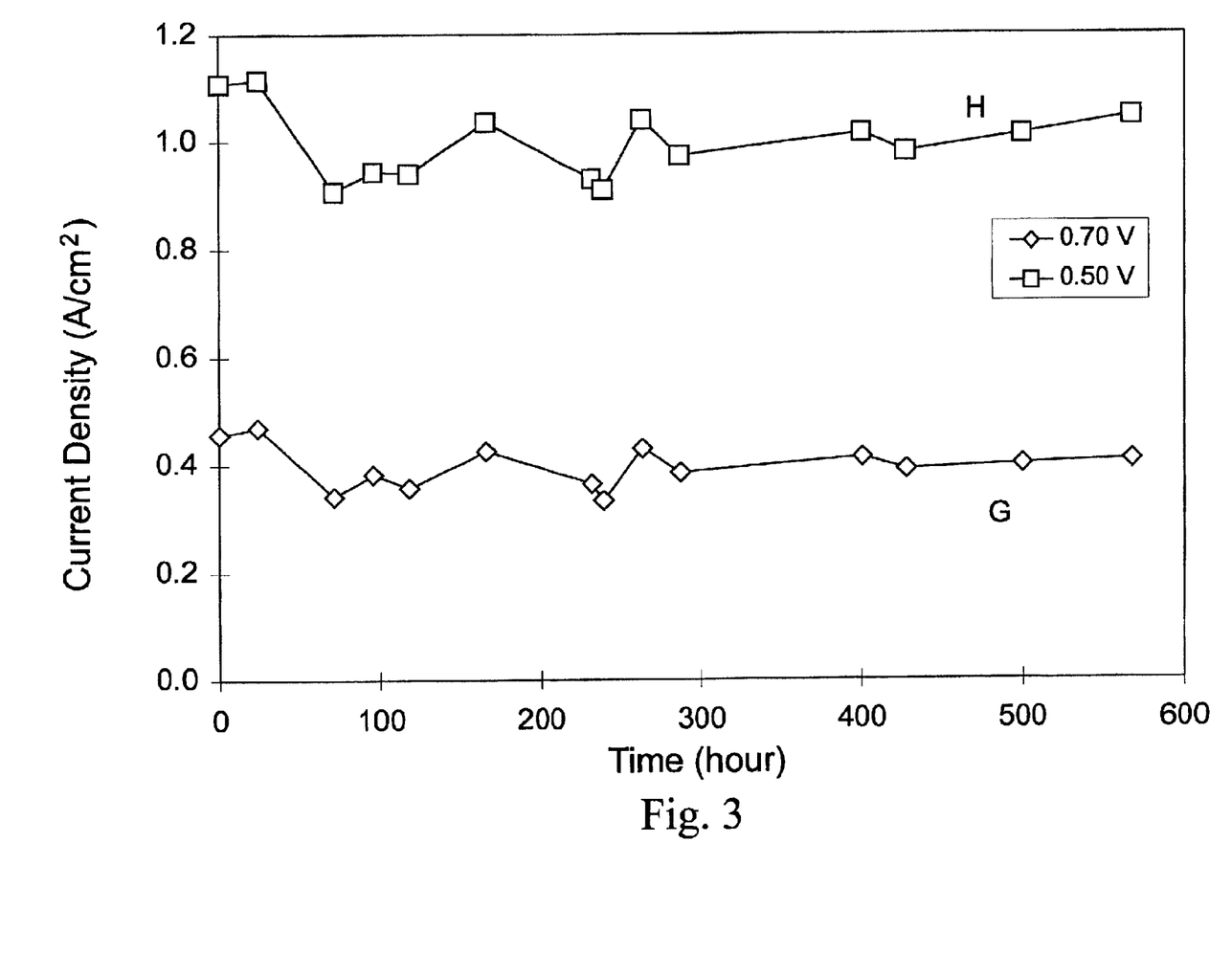
FIG. 3 depicts a graph of the performances of the activated electrode shown in FIG. 1 within a four-week period after the initial activation.

The activation effect proved to be permanent. The activated electrode in FIG. 1 was tested for about 4 weeks. During this time, the cell was operated continuously for a few days, shut down for a few days and then restarted the next day, or frozen for a few days then started the next day. Curves G and H in FIG. 3 show the cell current densities at 0.70 and 0.50 V, respectively, when the cell was tested at 35/45/45° C. The performance fluctuated, but the trend showed very little decrease in 4 weeks.

It is believed that the fluctuation was due mainly to water management rather than loss of activation. The cell was once frozen at –17° C. for 3 days, after which it was difficult to start because the passes for the reactant flow were blocked by ice. After the ice was melted by the gaseous reactants, the cell immediately exhibited good performance.

Figure 4:
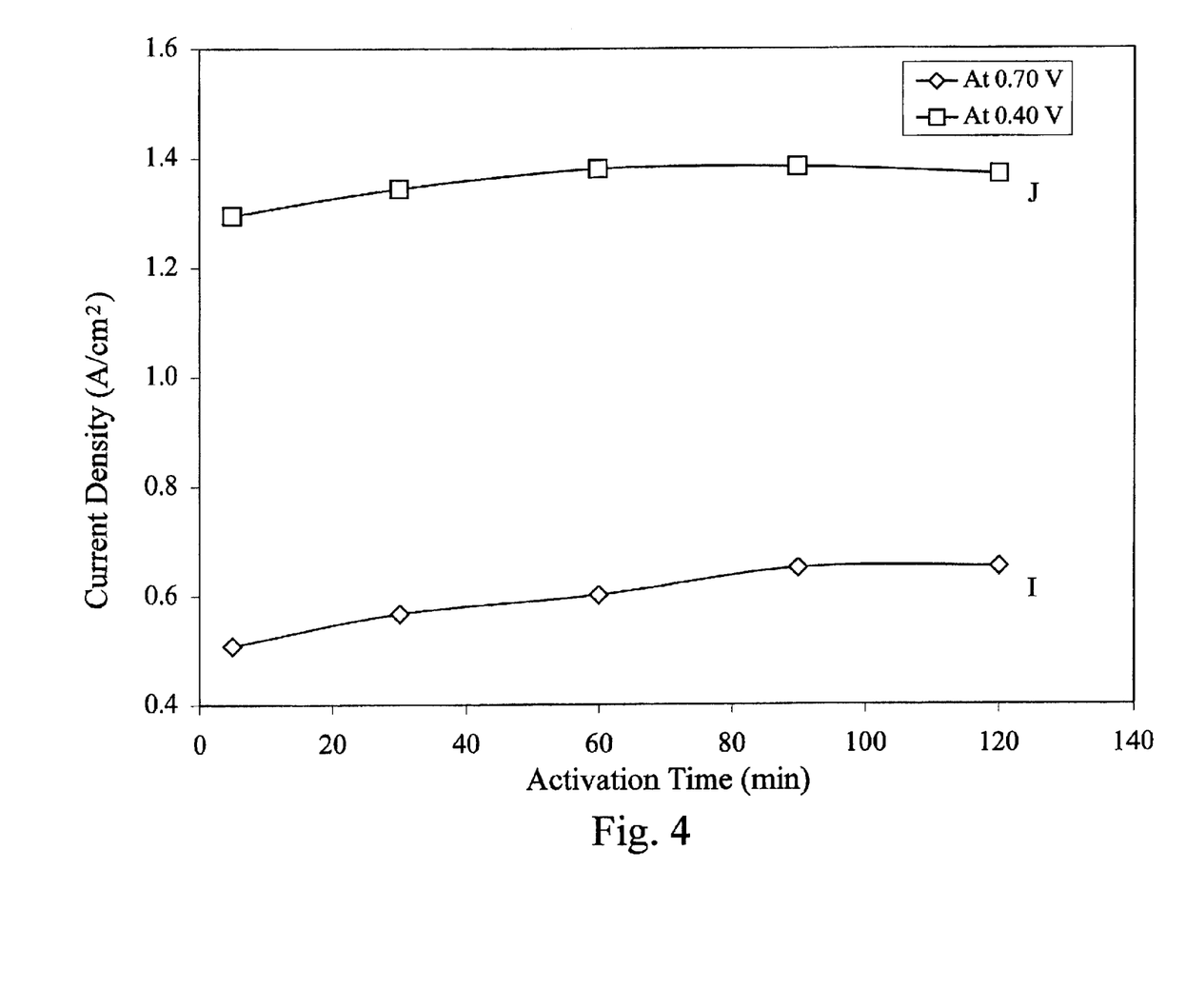
FIG. 4 shows a graph of the performances of an electrode after being activated for different lengths of time.

Activation can be achieved very quickly. Referring to FIG. 4, the cell performance during the activation process is shown at 75/95/90° C. and 15/20 psig. The electrode had a Pt loading of 0.17 mg/cm$^2$ that was made using an old batch of Engelhard 20% Pt/C on a carbon paper-type gas diffusion medium. The current densities at 0.70 and 0.40 V, respectively, are shown in FIG. 4 as curves I and J. The cell achieved 78% activation at 0.70 V, and 93% activation at 0.40 V, after only a short period (as little as 5 minutes). After 30 minutes, the cell achieved 87% activation at 0.70 V, and 97% activation at 0.40 V. After 60 minutes, the cell achieved 93% activation at 0.70 V, and 100% activation at 0.40 V. After 90 minutes, the cell achieved 100% activation at 0.70 V. Clearly, the activation proceeded at a very fast pace and most of the activation was achieved in the first few minutes.

A variety of supported catalysts manufactured by different companies was tested. They could all be fully activated within 2 hours although different catalysts might need different activation times. Generally speaking, catalysts with lower Pt contents on the support (e.g., 10% Pt/C) needed more activation time than those with higher Pt contents on the support (e.g., 40% Pt/C). In addition, the improvement in performance after activation is larger for catalysts with lower Pt contents on the support. The activation procedure was also applicable to electrodes made using unsupported catalysts, such as Pt black, but the increase in performance was normally less than that of electrodes made using supported catalysts. The activation proceeds faster at higher cell temperature and higher backpressure. MEAs consisting of different kinds of membranes or the same kind of membrane but having different thickness, were all able to be activated quickly. The same is true for MEAs whose electrodes contained various amounts of Nafion and PTFE.

The percentage performance improvement due to activation was different for electrodes with different Pt loadings, although they were made with the same catalyst. The lower Pt loading electrode shows more increase in performance.

Figure 5:
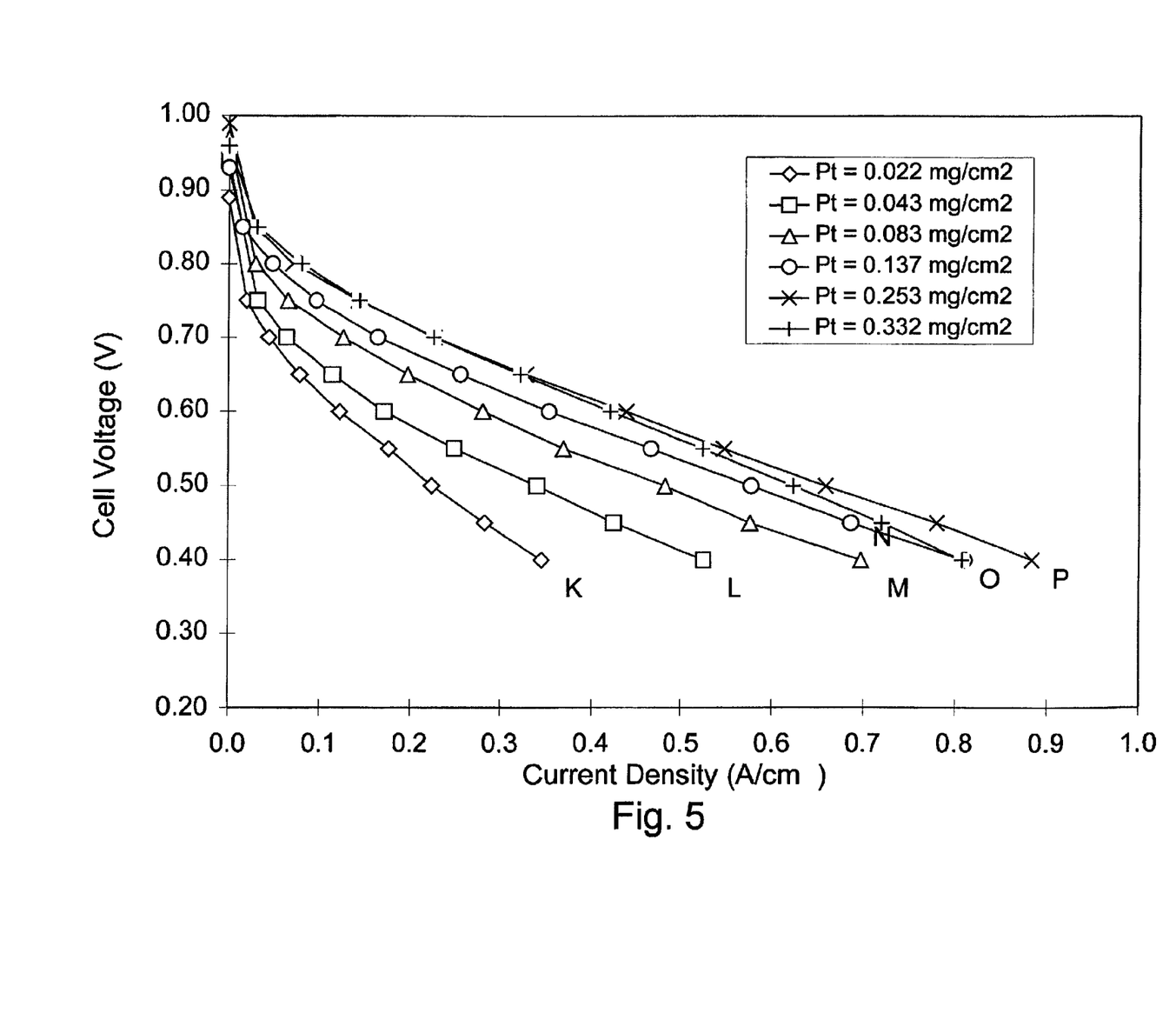
FIG. 5 illustrates a graph of the performances of various Pt-loaded electrodes before activation.

Referring to FIG. 5, the performances of six electrodes are shown. The electrodes were made using E-TEK 20% Pt/Vulcan XC-72 material with Pt loadings of 0.022, 0.043, 0.083, 0.137, 0.253, and 0.332 mg/cm$^2$, at 35/45/45° C. before activation. The performance increased with Pt loading up to 0.253 mg/cm$^2$.

Figure 6:
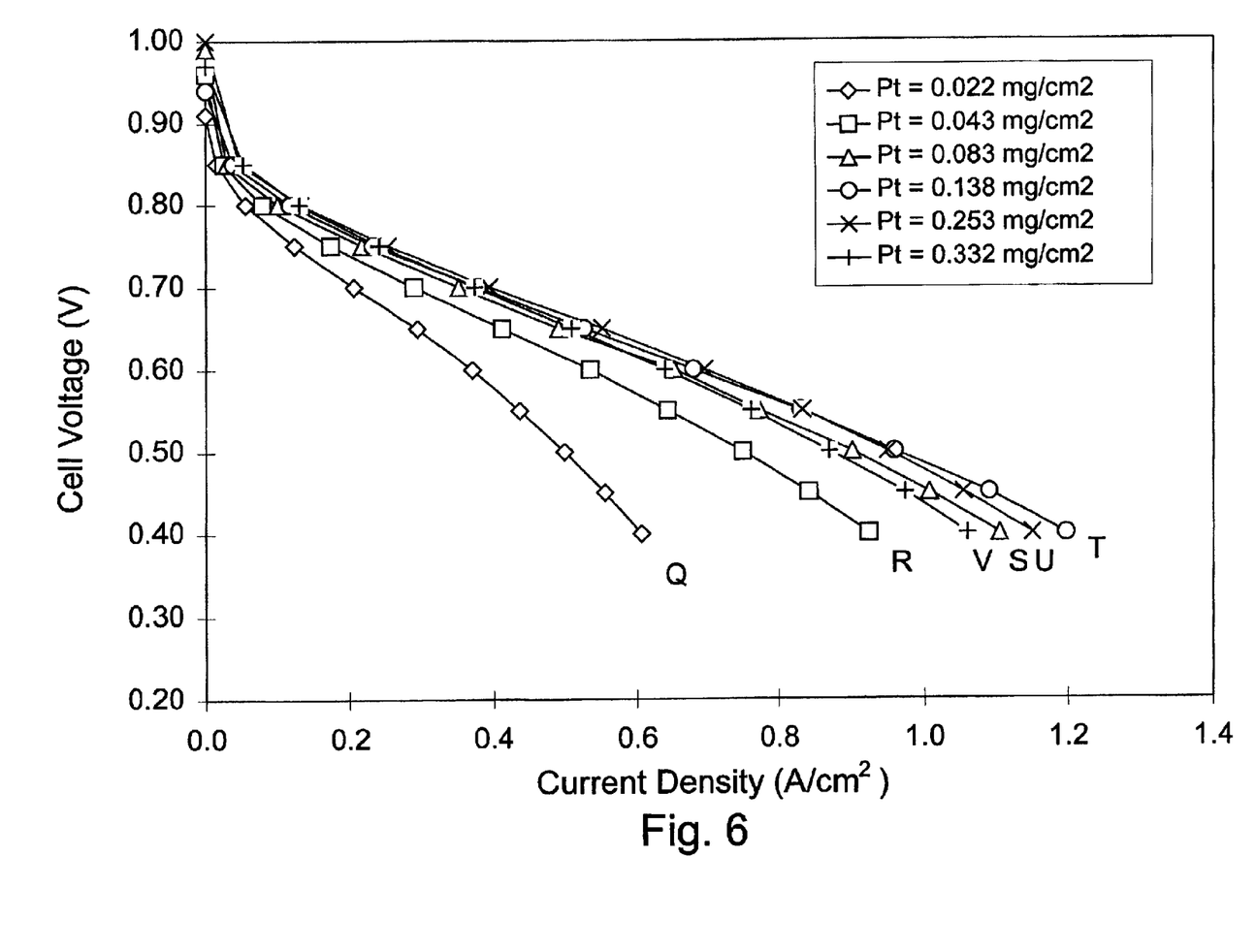
FIG. 6 depicts a graph showing the performances of the electrodes shown in FIG. 5 after activation.

After being activated at 75/95/90° C. and 20/30 psig for 2 hours, all of the electrodes showed large increases in performance, but the lower Pt loaded electrodes increased more in percentage, as shown in FIG. 6. After activation, the performances of electrodes with Pt loadings of 0.083 to 0.332 mg/cm$^2$ were much closer with the electrode having a Pt loading of 0.138 mg/cm$^2$ exhibiting the best performance. It was found that when 20% Pt/C was used to make an electrode, the Pt loading had to be controlled around 0.15 mg/cm$^2$ in order for the best performance to be achieved with the minimum amount of Pt. Further increasing Pt loading increases the catalyst layer thickness, which in turn increases the electrical and ionic resistance of the catalyst layer and the mass transport resistance to reactants.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A procedure for activating a membrane-electrode assembly (MEA) of an electrochemical cell operating at substantially ambient conditions, said activation procedure including the steps of:

a) providing an electrochemical cell designed for operation at an ambient temperature and at substantially atmospheric pressure, said electrochemical cell comprising an MEA having a three-dimensional catalyst layer comprising a plurality of catalyst sites, a plurality of said catalyst sites being dead catalyst sites;

b) prior to operating said electrochemical cell, activating said electrochemical cell by exposing the MEA to temperatures higher than ambient temperature, and substantially simultaneously back-pressurizing gaseous reactants at a pressure above atmospheric pressure so as to activate a portion of said dead catalyst sites;

c) after the activation of the electrochemical cell, returning conditions of said electrochemical cell to ambient conditions; and d) operating said electrochemical cell at said ambient temperature and at substantially atmospheric pressure.

2. The activation procedure according to claim 1, where catalysts, either unsupported or supported, are used to fabricate said MEA.

3. The activation procedure according to claim 1, wherein the electrochemical cell operates at a temperature during activation that is higher than the temperature at which the electrochemical cell is intended to operate, but not too high that it can cause decomposition of the electrochemical cell materials or dehydration of the MEA.

4. The activation procedure according to claim 1, where gaseous reactants are pressurized.

5. The activation procedure according to claim 4 where gaseous reactants are pressurized to less than 5 atmospheres.

6. The activation procedure according to claim 4, wherein a pressure difference between a cathode gaseous reactant and an anode gaseous reactant is less than 5 atmospheres.

7. The activation procedure according to claim 1, where the activation procedure lasts more than approximately 5 minutes.

8. The activation procedure according to claim 1, where the activation procedure further comprises the step of:

e) monitoring said electrochemical cell during the activation.

9. The activation procedure according to claim 1, where the humidification conditions of gaseous reactants are controlled.

10. The activation procedure according to claim 1, where the electrochemical cell is operated between a changing load and a constant load.

11. The activation procedure according to claim 1, where the electrodes contain various amounts of catalysts, ionomers, and/or water repelling agents.

12. The activation procedure according to claim 1, where the MEA includes catalyst-coated membrane (CCM).

* * * * *